DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1323

T883,023

GAS DRYING OVEN WITH ENDLESS BELT AND BELT CLEANER

Robert L. Craven and John F. Hesselberth, Wilmington, Del., assignors to E. I. du Pont de Nemours and Company, Wilmington, Del., a corporation of Delaware

Filed Feb. 3, 1970, Ser. No. 8,353

Int. Cl. F26b *19/00*

U.S. Cl. 34—85

1 Sheet Drawing. 8 Pages Specification

An apparatus for moving fibrous batts impregnated with an adhesive through a gas dryer that includes an endless belt having upper and lower reaches passing respectively into and out from the dryer. The belt has slots through it to permit circulation through the belt as it passes through the dryer. A driven rotatable nylon bristle brush is located adjacent the lower reach so that its bristles extend into the slots of the belt as the lower reach moves past the brush. An air circulation system encompassing the brush and the belt located at the entrance to the dryer may be used to control the temperature of the brush.

Feb. 23, 1971 R. L. CRAVEN ET AL T883,023
GAS DRYING OVEN WITH ENDLESS BELT AND BELT CLEANER
Filed Feb. 3, 1970
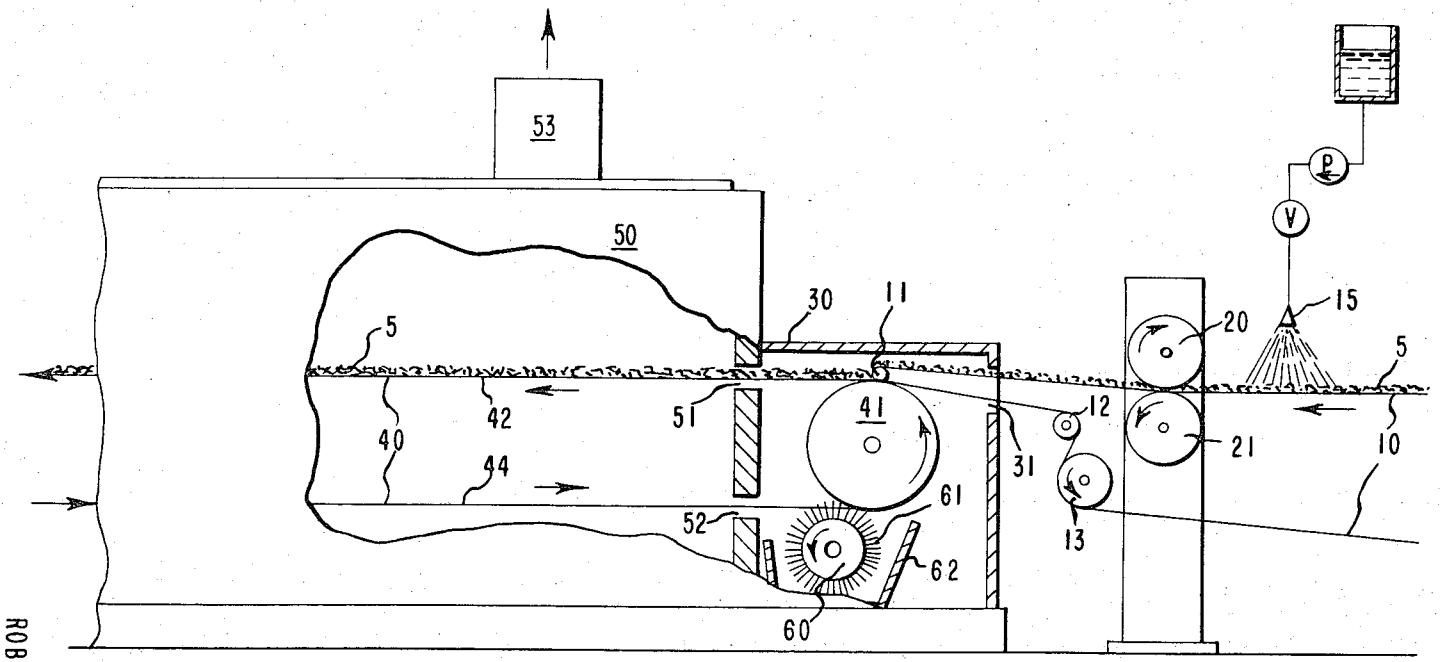
INVENTORS
ROBERT L. CRAVEN
JOHN F. HESSELBERTH
BY Howard P. West Jr.
ATTORNEY